May 1, 1928. 1,667,894
H. O. HEM
WEIGHING SCALE
Filed July 16, 1926 2 Sheets-Sheet 1
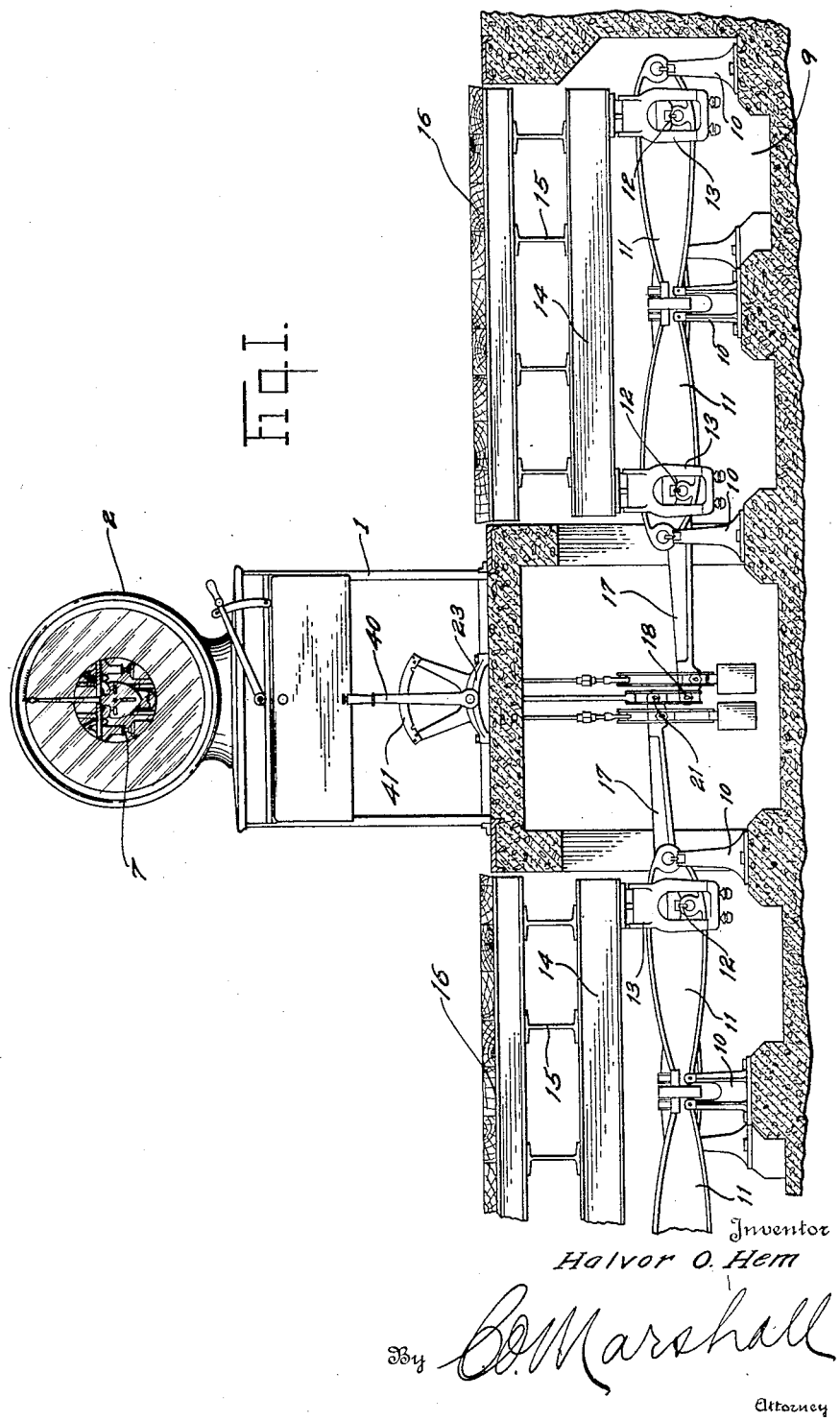
Inventor
Halvor O. Hem
By C. O. Marshall
Attorney

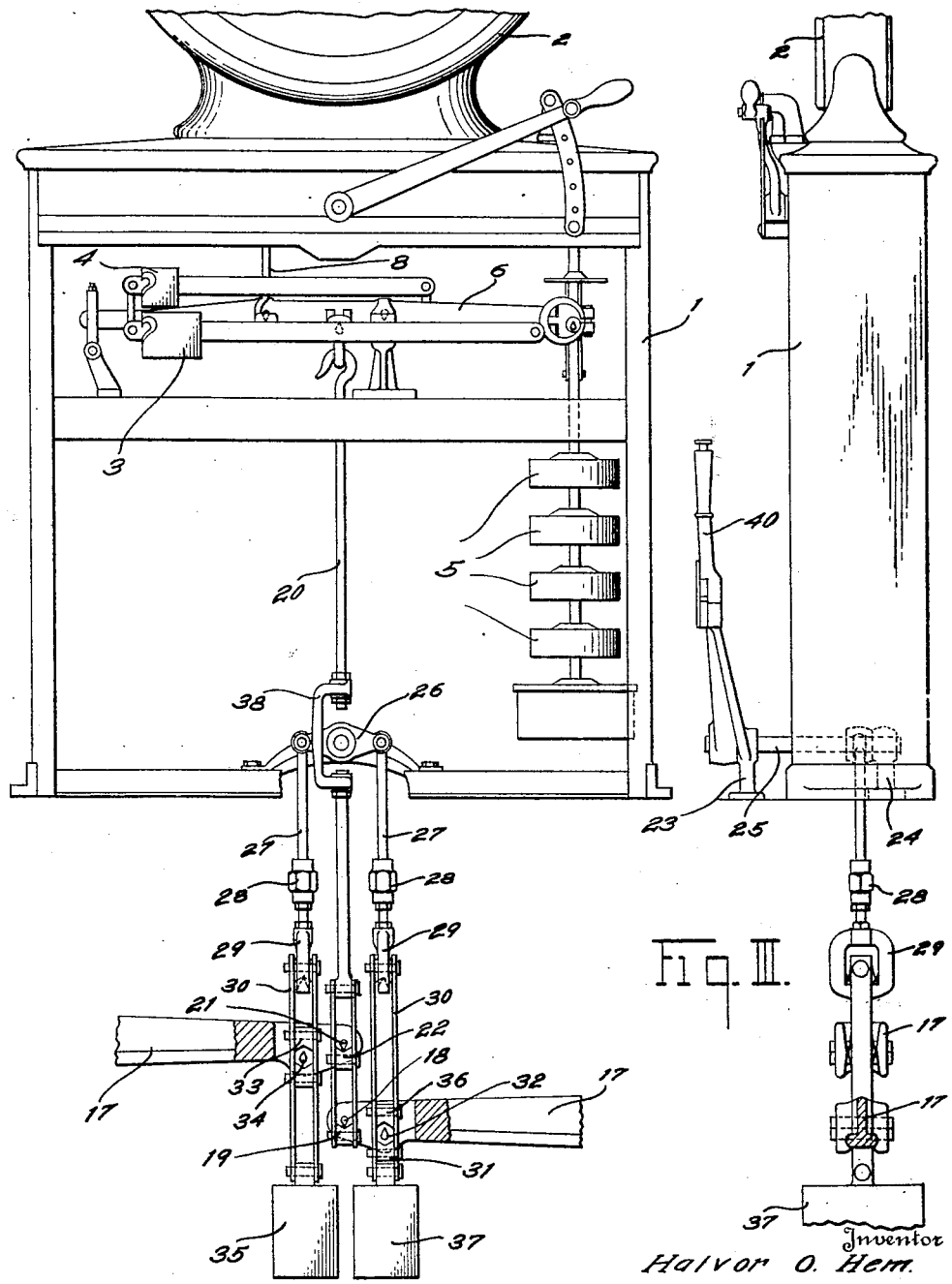

Patented May 1, 1928.

1,667,894

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed July 16, 1926. Serial No. 122,862.

This invention relates to weighing scales, and particularly to weighing scales of the so-called heavy capacity type, and one of its principal objects is the provision of a scale having a plurality of platforms which may be used selectively in weighing commodities, or two or more of which may be used together.

Another object is the provision of a scale having two or more platforms adapted to be selectively connected or disconnected to the load-counterbalancing mechanism, with means for compensating for the reduction in initial pull on the load-counterbalancing mechanism, when one of the said platforms is disconnected.

Under some conditions it is desirable to weigh commodities of great length or bulk which cannot be conveniently supported upon a single load platform of ordinary size and such conditions sometimes occur in industries in which scales for weighing loads of ordinary type are required. For examples, it is sometimes required that long lengths of structural steel be weighed or that the weight of an airplane be determined. The distance between the wheels of a large airplane is very great and a very large scale platform would be required to properly support a machine of large dimensions. My invention has for an object the provision of means for conveniently weighing such bulky or unusual commodities, as well as commodities of ordinary dimensions.

Another object of my invention is the provision of a scale whch may have platforms in two or more positions so that it may be conveniently used for weighing commodities that are being trucked over different runways.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a front elevational view, partly in section, showing the mechanism of my invention, parts being broken away;

Figure II is an enlarged front elevational view, with parts in section, showing means for connecting the platform lever mechanism to the load-counterbalancing mechanism;

Figure III is a side elevational view of the parts illustrated in Figure II.

Referring to the drawings in detail, the load-counterbalancing mechanism of the scale as illustrated is contained in a cabinet 1 surmounted by a watch-case-shaped housing 2, the counterbalance consisting of poises 3 and 4 and unit weights 5 carried by a lever 6 and automatic pendulum mechanism 7 which is connected to the lever by means of a link 8 and other connections (not shown). The load-counterbalancing mechanism above briefly described is of well known form. Instead, however, of the usual single platform and set of platform lever mechanism, I employ two or more sets, those shown herein being duplicates, although they may, if conditions require, be of different sizes and shapes. The platform lever mechanism for each platform is contained in a pit 9 being fulcrumed on stands 10, the levers 11 having load pivots 12 which act through brackets 13 to support the beams 14 and 15 upon which the platform structures 16 rest. Each of the platform lever mechanisms includes an extension lever 17. The nose pivot 18 of one set of lever mechanism is engageable with a bearing 19 at the lower end of a connecting link 20 supported by the beam lever 6, while the nose pivot 21 of the extension lever forming a part of the other set of platform lever mechanism is engageable with a similar bearing 22 located above the bearing 19. When both nose pivots 18 and 21 are engaged with their bearings 19 and 22 a load may be weighed upon either platform 15 or 16, or a bulky load may be supported and weighed upon both of them acting together.

It is often desirable, however, to have one set of platform lever mechanism disconnected from the automatic counterbalancing mechanism so that weighing on the connected platform may be conducted undisturbed by the passage of persons or trucks over the disconnected platform. For the purpose of disconnecting one platform or the other I have provided means for lifting one or the other of the extension lever nose pivots from engagement with its bearing. This lifting device is supported by a pair of brackets 23 and 24 in which is journaled a rock shaft 25 to which is fixed a pair of oppositely extending arms 26, each arm 26 carrying at its end a series of links by means of which the nose of its extension lever may be lifted. Each series of links consists of an upper section 27 adjustable in length by means of a turn buckle 28 and a universal lost motion connection 29 from which depends a pair of links 30. One pair of links 30 carries a bearing 31 near its lower end which, when the links are pulled upwardly, engages the pivot 32 on its extension lever and lifts the nose pivot 18 from its bearing 19. In order to compensate for the loss of initial pull due to the removal of the weight of one of the levers 17 from the connecting link 20, the opposite set of links which moves downwardly as the pivot 18 is raised is provided with a bearing 33 which engages a pivot 34 so that this pair of links 30 is hung upon the lever. At the lower end of the links is suspended a weight 35, the mass of which is sufficient to compensate for the loss of weight resulting from lifting one of the extension levers. The other set of links 30 is provided with a bearing 36 and a weight 37 similar in function to the bearing 33 and weight 35.

In order that the weights 35 and 37 may hang freely, the lost motion connections 29 are so constructed that they become disconnected when the weights are deposited upon the levers. The connecting link 20 is shown as provided with a yoke 38 to avoid interference with the arms 26. Keyed or otherwise rigidly secured to the rock shaft 25 is a handle 40 which is provided with a pawl engageable with notches in a quadrant 41, the notches being so located as to hold the handle in central position or in position at either end of the quadrant. When the handle is in central position neither the weight 35 nor the weight 37 is supported by the extension levers 17 and both extension levers are connected to the load-counterbalancing mechanism. With the handle in this position a load may be weighed upon both platforms or a load may be weighed upon either platform.

When the handle is in position at the right end of the quadrant the weight 37 is carried by the extension lever 17 which is connected to the load-counterbalancing mechanism, the other lever 17 being lifted out of connection with the load-counterbalancing mechanism. With the handle in this position loads may be weighed on the right platform undisturbed by the passage of traffic over the left platform, which is disconnected from the weighing mechanism.

When the handle is in position at the left end of the quadrant the lever mechanism supporting the left platform is connected to the load-counterbalancing mechanism and the lever mechanism supporting the right platform is disconnected. Weighing operations using the left platform may, therefore, be conducted undisturbed by the passage of traffic over the right platform.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, load-counterbalancing mechanism, a plurality of commodity-receivers, means for connecting said commodity-receivers to said load-counterbalancing mechanism, and means for disconnecting either of said commodity-receivers from said load-counterbalancing mechanism and simultaneously applying to said load-counterbalancing mechanism a load equal to the load applied thereto when the disconnected commodity-receiver is connected.

2. In a device of the class described, in combination, load-counterbalancing mechanism, a pair of platform lever mechanisms, platforms supported thereby, means connecting said platform lever mechanisms to said load-counterbalancing mechanism, and means whereby either of said platform lever mechanisms may be disconnected and a load equal to the initial load of such disconnected mechanism applied to said load-counterbalancing mechanism.

3. In a device of the class described, in combination, load-counterbalancing mechanism, a pair of commodity-receivers, a lever connecting each of said commodity-receivers to said load-counterbalancing mechanism, means for disconnecting one of said levers from said load-counterbalancing mechanism, and means for simultaneously increasing the pull of the connected lever by an amount equal to the pull when connected of the disconnected lever.

4. In a device of the class described, in combination, automatic load-counterbalancing mechansm, a pair of commodity-receivers, a lever connecting each of said commodity-receivers to said automatic load-counterbalancing mechanism, means for disconnecting one of said levers from said automatic load-counterbalancing mechanism, and means for simultaneously increasing the pull of the connected lever by an amount equal to the pull when connected of the disconnected lever.

5. In a device of the class described, in combination, load-counterbalancing mechanism, a pair of commodity-receivers, a lever connecting each of said commodity-receivers to said load-counterbalancing mechanism, a pivoted member, a pair of weights depending from said pivoted member, and means whereby when said pivoted member is rocked one of said weights is deposited upon one of said levers and the other of said levers is simultneously disconnected from said load-counterbalancing mechanism.

HALVOR O. HEM.